US008228959B2

(12) United States Patent
Brownell

(10) Patent No.: US 8,228,959 B2
(45) Date of Patent: Jul. 24, 2012

(54) FREE ELECTRON LASER, AND ASSOCIATED COMPONENTS AND METHODS

(75) Inventor: James Hayden Brownell, Thetford Center, VT (US)

(73) Assignee: The Trustees of Dartmouth College, Hanover, NH (US)

( * ) Notice: Subject to any disclaimer, the term of this patent is extended or adjusted under 35 U.S.C. 154(b) by 1895 days.

(21) Appl. No.: 10/529,343

(22) PCT Filed: Sep. 26, 2003

(86) PCT No.: PCT/US03/30566

§ 371 (c)(1), (2), (4) Date: Mar. 25, 2005

(87) PCT Pub. No.: WO2004/038874

PCT Pub. Date: May 6, 2004

(65) Prior Publication Data

US 2006/0050269 A1 Mar. 9, 2006

Related U.S. Application Data

(60) Provisional application No. 60/414,119, filed on Sep. 27, 2002.

(51) Int. Cl.
*H01S 3/11* (2006.01)
*H01S 3/115* (2006.01)
*H01S 3/10* (2006.01)

(52) U.S. Cl. ................. 372/10; 372/12; 372/21; 372/26

(58) Field of Classification Search .................. 372/102, 372/2, 4, 74, 12, 21, 26; 356/315, 102
See application file for complete search history.

(56) References Cited

U.S. PATENT DOCUMENTS 4,852,956 A * 8/1989 Kramer .......................... 359/17
4,972,075 A * 11/1990 Hamada et al. ............ 250/201.5
5,263,043 A * 11/1993 Walsh .......................... 372/102
5,790,585 A 8/1998 Walsh

OTHER PUBLICATIONS

Walsh, J. E., et al "A New Far Infrared Free-Electron Laser" Nuclear Instruments & Methods in Physics Research, Section—A: Accelerators, Spectrometers, Detectors and Associated Equipment, North-Holland Publishing Company. Amsterdam, NL, vol. 429, No. 1-3, Jun. 11, 1999, pp. 457-481, XP004171254, ISSN: 0168-9002.

Urata, J., et al "Superradiant Smith-Purcell Emission" Physical Review Letters, Jan. 19, 1998, APS, USA, vol. 80, No. 3, pp. 518-519, XP002277686, ISSN: 0031-9007.

Bakhtyari, A., et al "Amplified-Spontaneous-Emission Power Oscillation in a Beam-Wave Interaction" Physical Review E. (Statistical, Nonlinear, and Soft Matter Physics), Jun. 2002, APS through AIP, USA, vol. 65, No. 8, pp. 066503/1-4, XP002277687, ISSN: 1063-651X.

Van Den Berg, P. M. "Smith-Purcell Radiation From a Point Charge Moving Parallel to a Reflection Grating" Journal of the Optical Society of America, Dec. 1973, USA, vol. 63, No. 12, pp. 1588-1597, XP009029663, ISSN: 0030-3941.

* cited by examiner

*Primary Examiner* — Patrick Stafford
(74) *Attorney, Agent, or Firm* — Lathrop & Gage LLP

(57) ABSTRACT

A system generates FIR laser radiation. An electron source generates an electron beam. A grating horn interacts with the electron beam to produce the FIR laser radiation. The grating horn may comprise a flat base and a pair of grating elements attached to the base, each of the grating elements being ruled with a grating period, the grating elements oriented in phase and in substantial symmetry about a normal to the flat base.

15 Claims, 7 Drawing Sheets

FREE ELECTRON LASER, AND ASSOCIATED COMPONENTS AND METHODS

RELATED APPLICATIONS

This application claims priority to U.S. provisional application Ser. No. 60/414,119, filed Sep. 27, 2002, and hereby incorporated by reference.

GOVERNMENT LICENSE RIGHTS

The U.S. Government has certain rights in this invention as provided for by the terms of Grant #DAAD 19-99-1-0067 awarded by the Army Research Office, and of Grant #ECS-0070491 awarded by the National Science Foundation.

BACKGROUND

The terms "Terahertz" and "far infrared" (FIR) identify the range of the electromagnetic spectrum with free space wavelengths of about 10 to 1000 microns, or with wavenumbers from about 1000 to 10 $cm^{-1}$. Humans have developed extensive technology to generate and detect electromagnetic waves or vibrations throughout the electromagnetic spectrum—from the very short wavelengths and very high frequencies of gamma rays to the very long wavelengths and very low frequencies of radio waves—with the exception of the far infrared ("FIR") gap in the spectrum existing between infrared light and millimeter wavelength microwaves. In the FIR gap, various sources and detectors exist; but they are not practical (e.g., they lack intensity, frequency-tuning ability and/or stability).

In the late 1980's, the research of the late Professor John Walsh at Dartmouth College and others led to the development of radiation sources that produce electromagnetic radiation at FIR frequencies in a tunable fashion. See, e.g., U.S. Pat. No. 5,263,043 and U.S. Pat. No. 5,790,585, each of which is hereby incorporated by reference. Walsh's work showed that a small, compact and relatively inexpensive table top free electron laser could be a commercially practiced device to generate FIR electromagnetic waves.

The Smith-Purcell (S-P) effect, first observed in 1953, can be seen as the scattering of an electron's evanescent wake field from a grating. The wavelength ($\lambda=2\pi c/\omega$) of the emitted radiation is dependent on the grating period (l), electron velocity (v), and emission angle relative to the beam direction ($\theta$), by the so called S-P relation $$\lambda = \frac{l}{m}\left(\frac{c}{v} - \cos\theta\right),$$

(Equation 1) where m is the diffraction order of the emission. This relation has been confirmed for spontaneous S-P radiation experiments spanning the visible, THz, to microwave spectrum.

SUMMARY OF THE INVENTION

In one embodiment, a free electron laser ("FEL") employing the Smith-Purcell effect is disclosed. The FEL includes a diffraction grating element that has a first block having a first beveled side (with a first grating ruled thereon) and a second block having a second beveled side (with a second grating ruled thereon).

In one embodiment, the grating element includes a flat base to which at least one of the blocks is attached. In an embodiment, the beveled side of the first block can be at a ten degree angle relative to a plane perpendicular to the flat base. In an embodiment, the beveled side of the second block can be at a ten degree angle relative to a plane perpendicular to the flat base. In an embodiment, the angles of the beveled side of the first block and the beveled side of the second block together form an opening angle. In an embodiment, the opening angle can be 20 degrees. In an embodiment, the opening angle can be in the range from about 180 degrees down to as small as is practical (e.g., 10 degrees or less). In an embodiment, the grating of the first block can be aligned with the grating of the second block so that the two gratings are in phase.

In one embodiment, a grating horn includes a flat base and a pair of grating elements attached to the base, each of the grating elements being ruled with a grating period. The grating elements orient in phase and in substantial symmetry about a normal to the flat base such that an electron beam interacting with the grating elements produces Terahertz radiation.

In one embodiment, a system generates FIR laser radiation. An electron source generates an electron beam. A grating horn interacts with the electron beam to produce the FIR laser radiation.

In one embodiment, a system generates FIR laser radiation. An electron source generates an electron beam. A plurality of gratings interact with the beam, one at a time: each of the gratings being positionable to a focus of the electron beam to interact with the electron beam to produce the FIR laser radiation, each of the gratings being ruled differently to modify emission angle of the FIR radiation.

In one embodiment, a method generates FIR radiations including: generating an electron beam; and focusing the electron beam to a grating horn, wherein interaction between the electron beam and the grating horn produces the FIR radiation.

In one embodiment, a system excites, modulates, stimulates particles. A particle source generates a particle beam. A coherent radiation source emits coherent radiation. Optical elements focus the radiation into a grating horn for interacting with the particle beam so as to excite, modulate and/or stimulate particles of the particle beam.

DETAILED DESCRIPTION

Figure 1:
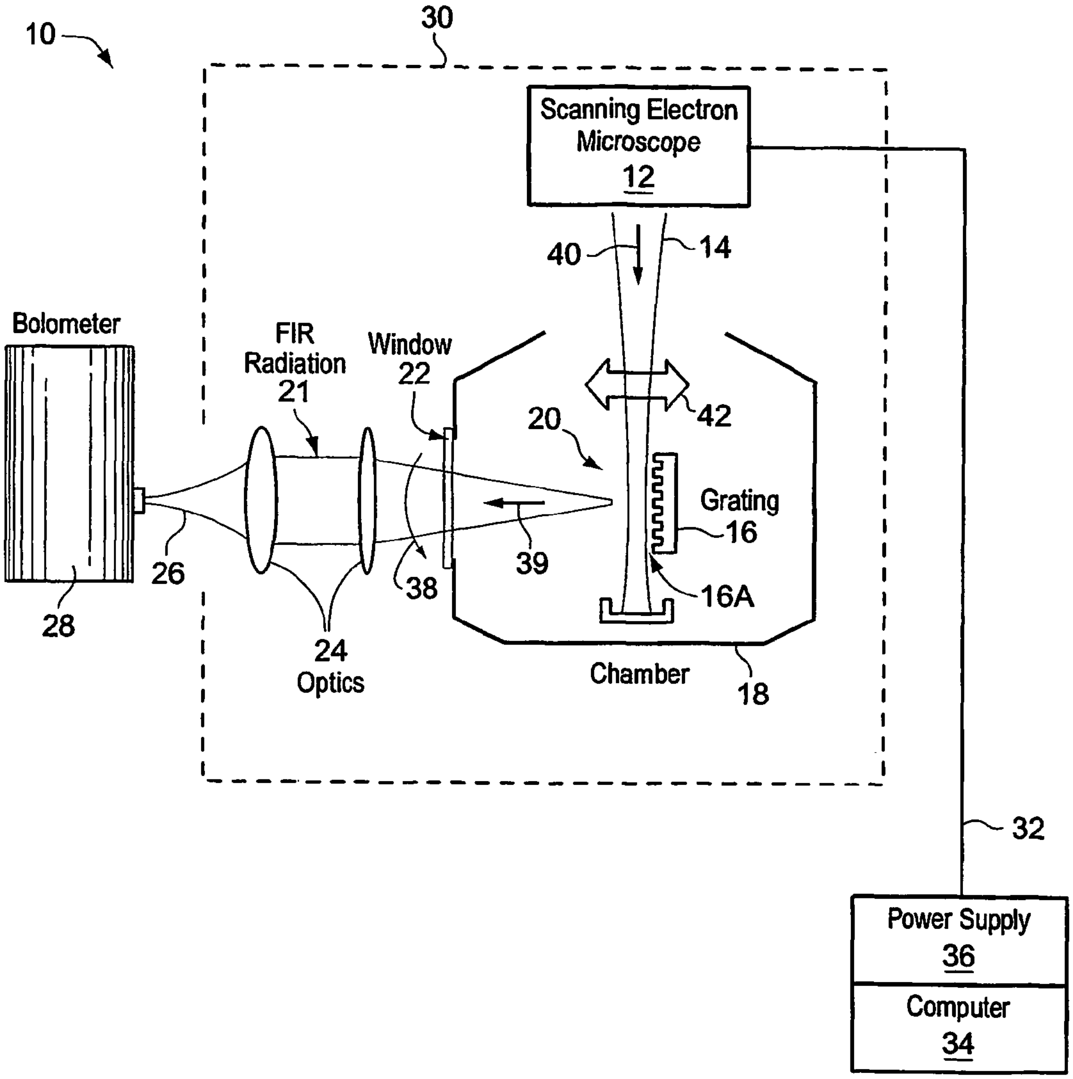
FIG. 1 schematically one Smith-Purcell Free Electron Laser.

FIG. 1 depicts one embodiment of a free electron laser 10. A scanning electron microscope (SEM) 12 generates an electron beam 14, as shown. A grating 16 (illustratively mounted on a specimen stage within a specimen chamber 18) is positioned at the beam focus 20 of electron beam 14. FIR energy

21 scatters from grating 16 and exits chamber 18 through a window 22, for example made from polyethylene. Optics 24 (e.g., a pair of TPX (tetramethyl-1-pentene) lenses that exhibit optical refraction characteristics to FIR radiation 21) may be used to focus energy 21 into a laser beam 26. FIG. 1 also illustratively shows a detector 28 (e.g., a bolometer) that may be used to detect radiation of laser beam 26.

The size of grating 16 may affect the overall size of laser 10, which may for example be formed into a hand-held unit 30 attached by an umbilical 32 (e.g., containing electrical wiring and data busses) to a computer 34 and power source 36. For example, power supply 30 operating within a range of 10-100 kV ($v/c=0.1$-$0.7$) may be used to accelerate electron beam 14 to grating 16. FIG. 1 shows laser 10 with an optional electron dump 25, to capture stray electrons.

An emission angle 38 of FIR radiation 21 is for example about 20 degrees about a normal to grating 16; this produces continuously tunable FIR radiation 21 over a wavelength range of 1.5 to 10 times the grating period (on a first order basis, as described below). Coverage may be extended by (a) blazing the grating for higher orders and/or (b) mounting several gratings of different periods on a rotatable turret (i.e., a plurality of gratings, each of the plurality of gratings rotatable to beam focus position 20 and having a different periodicity).

Certain advantages may be appreciated by laser 10 as compared to the prior art. For example, laser 10 may be made as a portable unit 30, so that users can easily use FEL 10 within desired applications. In another example, laser output 26 from laser 10 may be tunable, narrowband, polarized, stable, and have continuously or pulsed spatial modes. See, e.g., J. E. Walsh, J. H. Brownell, J. C. Swartz, J. Urata, and M. F. Kimmitt, *Nucl. Ins &Meth.* A 429, 457 (1999), incorporated herein by reference.

The evanescent field from beam 14 decays exponentially with distance from the electron beam's trajectory (i.e., along direction 40) with an e-folding length equal to $\lambda v/2\pi c$ for non-relativistic beam energy. In one embodiment, therefore, the electrons of beam 14 pass within the e-folding length of the surface 16A of grating 16, in order that its field strength is sufficient to scatter FIR radiation 21, as shown. Reflection from grating surface 16A back onto the electrons of beam 14 may also provide laser amplification feedback, so that gain is sensitive to beam height 42 above grating 16. For a 30 kV beam 14, the e-folding length is sixteen microns for 1 THz (300 micron) radiation 21; This in turn causes stringent requirements on the diameter of electron beam 14; and this constraint is tighter for shorter wavelengths (i.e., less than 30 μm). Accordingly, laser interaction may be optimized through resonator design and beam focusing, as now discussed.

Figure 3A:
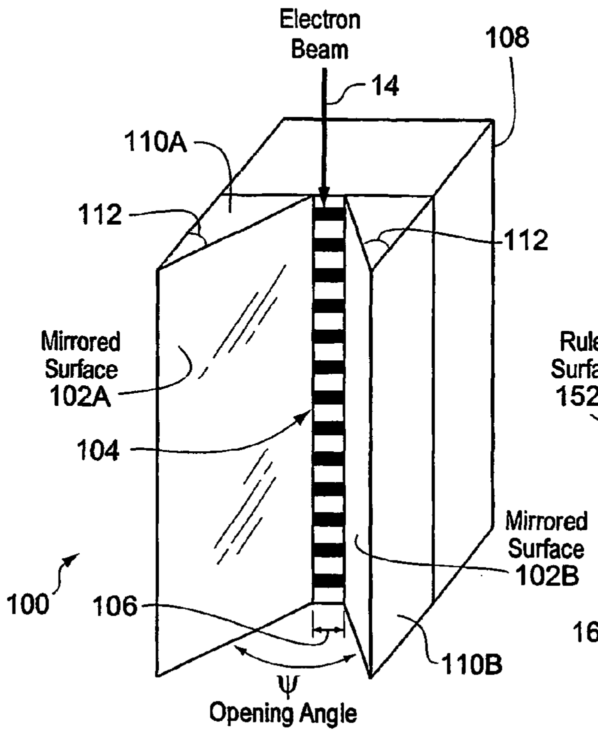
FIG. 3A shows one planar grating horn.

In one embodiment, grating 16 has a planar grating cut into the top of an aluminum block one centimeter long and a few millimeters wide, as in FIG. 3A. See also, e.g., J. Urata, M. Goldstein, M. F. Kimmitt, A. Naumov, C. Platt, and J. E. Walsh, *Phys. Rev. Lett.* 80, 516 (1998), incorporated herein by reference. With this configuration, there need not be mirrors or other external optics involved; it forms the laser resonator. In particular, electromagnetic energy travels slowly enough along grating 16 to grow significantly from grating feedback alone.

Figure 2:
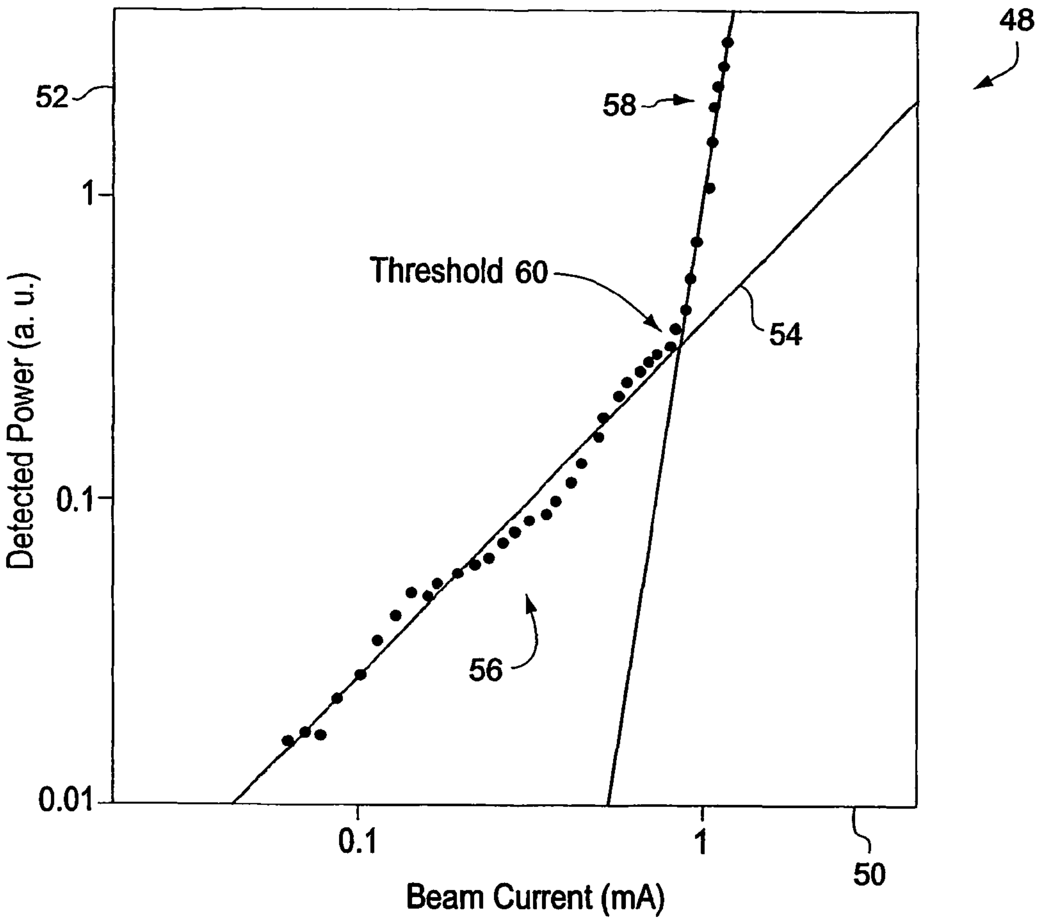
FIG. 2 depicts an exemplary relation between power and beam current for the grating within the Smith-Purcell Free Electron Laser of FIG. 1.

To illustrate this point, radiated power may be plotted against the beam current, as shown by graph 48 of in FIG. 2 In FIG. 2, x-axis 50 represents beam current while y-axis 52 represents detected power (a.u.). As shown in graph 48, the coupling strength grows with current and so output power also rises monotonically with current. The proportionality between current and power (slope=1 on plot 54) indicates spontaneous emission while a super-linear response implies amplification. A typical measurement for a planar grating is given in FIG. 2, experimentally determined, for example, in accordance with A. Bakhtyari, J. E. Walsh, and J. H. Brownell, Phys. Rev. E 65, 066503 (2002), which is hereby incorporated herein by reference. The signature of a gradual rise 56 followed by a steep rise 58 defines the laser threshold 60. In FIG. 2, the data at 0.5 THz was produced with 29 kV and a relatively broad 40 micron diameter beam 14. Using a planar grating described above, the performance yielded 1 microwatt power and 1.5 THz.

The wiggle evident in the sub-threshold region (i.e., along gradual rise 56) is likely caused by beating between coexistent waves on grating 16. See, e.g., Bakhtyari et al, 2002. This observation confirms the physical basis for the gain mechanism: these wiggles would not appear unless significant loss occurs, the primary source of loss being radiation 21. Other loss may be reduced by enclosing the resonator with roof and walls, such as in traveling-wave tubes at microwave frequencies. But, in so doing, some tunability may be sacrificed. Therefore, closure of the resonator is not usually beneficial. Other remedies for loss are to enhance the gain (as discussed above) and to improve output coupling.

The pattern of radiation 21 varies as the cosine squared of the azimuthal angle, normal to the beam direction 39 (see FIG. 1). See also, P. M. van den Berg, *J. Opt. Soc. Am.* 63, 1588 (1973), incorporated herein by reference. Given that optics 24 generally collect radiation 21 within a relatively small azimuthal range of angles 38, focusing radiation 21 as it leaves grating surface 16A will magnify the collectible intensity; but it is nonetheless preferable that the focusing elements do not disturb the dispersion described by the S-P relation of Equation 1 or else the power spectrum will be diffuse and brightness will diminish.

Figure 3B:
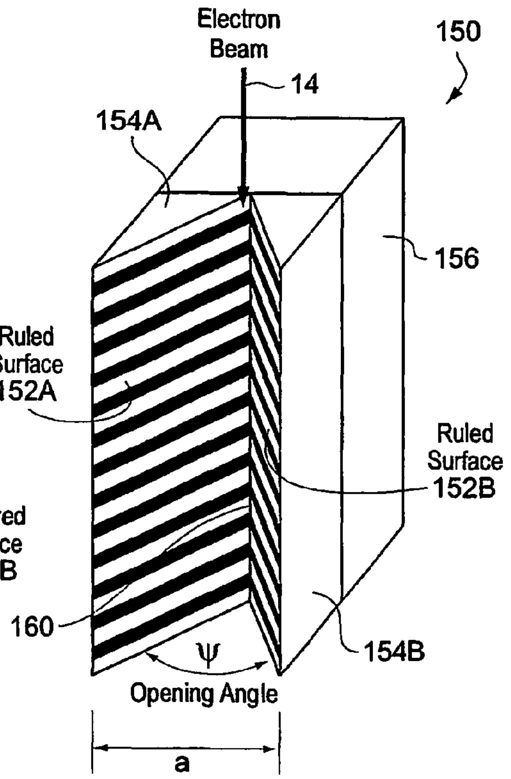
FIG. 3B shows one grating horn.

One solution (a grating horn antenna as in FIG. 3B) is based on a horn antenna. See, C. A. Balanis, *Antenna theory, analysis and design,* 2nd ed., John Wiley, New York, 1997, Section 13.3, incorporated herein by reference. A "horn" is the flared end of a hollow waveguide that enlarges the effective mode area in order to reduce diffraction effects. The waveguide then transmits or receives free propagating waves more efficiently. One horn has a linear flare forming, in the case of a rectangular waveguide, a pyramidal shape of four intersecting planes. The pertinent dimensions are the width of the horn's mouth ($\alpha$) and its full opening angle ($\psi$). If the width of the inlet is smaller than the wavelength, then a near diffraction limited light beam is directed along the horn bisecting axis with full divergence angle $\phi \neq \sin^{-1}(4\lambda/\alpha)$ for sufficiently large $\alpha$. Increasing the inlet width increases $\phi$, reduces magnification, and adds complicated structure to the radiation lobe.

The minimum spread, and therefore the greatest magnification of the peak intensity (i.e., peak horn directivity), occurs when the diffraction angle equals the half opening angle. This implies a constraint on the length (d) from the throat to the opening of the horn:

$$d \exists 2\lambda/\tan(\psi/2)\sin(\psi/2) \qquad \text{(Eq. 2)}$$

The input power is independent of $\psi$ so peak intensity varies inversely with the opening angle. The maximum magnification is then limited by the greatest practical horn depth.

FIG. 3A depicts one planar grating horn (PGH) 100. In the example of FIG. 3A, PGH 100 has two planar intersecting mirrors 102A, 102B, with specified opening angle $\psi$ there between, and a grating 104 embedded in the crease, parallel to the axis of intersection. The spacing 106 between mirrors 102A, 102B at the grating surface is usually less than one wavelength to provide optimal magnification, simple emission lobe structure, and minimal divergence angle $\phi$ for a given horn length d. Mirrors 102A, 102B of PGH 100 can fold the full emission lobe into the range of opening angle $\psi$, thereby enhancing the emitted intensity without altering the longitudinal angular dispersion expected from grating 104. The expected magnification over PGH 100 is then the ratio of the opening angle $\psi$ to 180 degrees. In addition, mirrors 102A, 102B can maintain independent components of polarization, TM (radial electric field) and TE (azimuthal electric field).

The S-P interaction of Equation 1 generates mainly TM polarization and so PGH 100 functions like an H-plane sectoral horn (see Balanis, 1997). To construct PGH 100, the grating surface 104 was ruled first in a suitable metal block 108. A pair of wedged blocks 110A, 110B (each with a wedge angle 112) with polished inner surfaces (forming mirrors 102A, 102B, respectively) were clamped so as to contact the surface of grating 104 separated by at least the width of electron beam 14. The opening angle of PGH 100 is then twice the wedge angle 112.

Figure 4:
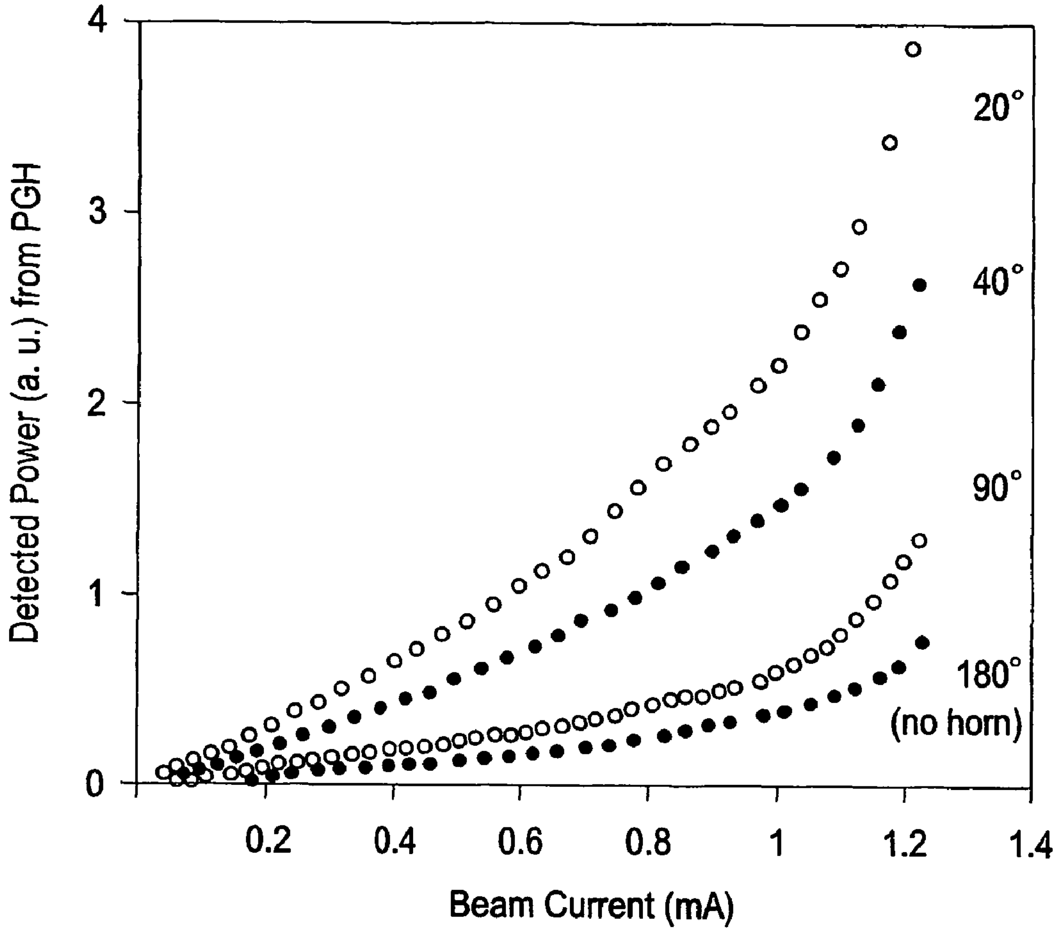
FIG. 4 depicts graphs of radiated power vs. beam current for an array of planar grating horns.

PGH 100 may for example incorporate opening angles $\psi$ of 20, 40, 90, and 180 degrees (i.e., no horn) under similar beam conditions; other angles $\psi$ may be chosen as a matter of design choice. To ease beam alignment during experimental testing, the separation between horn walls was 800 microns (20% wider than a wavelength). The results are shown in FIG. 4 with the opening angle indicated for each case (the electron beam 14 used in the testing of FIG. 4 was 29 kV with a beam waist of 58 μm). The measured power ratios for the first three cases of 6, 4, and 1.6 relative to the planar grating are 70% to 90% of the expected values. The full collection angle of the detection system (e.g., a bolometer 28, FIG. 1) was twelve degrees so that the measured power corresponded to the peak intensity for the larger openings. The smallest opening $\psi$ (twenty degrees) produces a ten degree lobe (e.g., defined within angle 38, FIG. 1) so the measured power is an average over the lobe and less than the peak intensity. Since consistent alignment of beam 14 along the horn vertex was difficult to maintain, slight variations may have caused reduced magnification.

In one embodiment, the horn may also ruled. That is, the grating may be wrapped about beam 14 to enhance the proximity of beam 14 to the grating surface, thereby improving coupling. The grating shape may also be chosen so as not to affect the S-P dispersion relation of Eq. 1. Ruling the horn can combine the focusing effect of the horn with the enhanced feedback from partial closure. A ruled horn has all of the emission characteristics of the H-plane sectoral horn described above and supports evanescent modes traveling synchronously with the electron beam. The region near the horn vertex of significant evanescent field strength expands with decreasing horn opening angle. Increasing the evanescent region allows greater overlap of a circular electron distribution and electric field and improved collimation of the electron beam, both of which contribute to greater energy transfer and improved laser performance. A new structure formed in this manner is termed a grating horn (GH), such as shown by a GH 150 in FIG. 3B.

GH 150 was manufactured by ruling two planar gratings 152A, 152B on solid metal blocks 154A, 154B, respectively, with one side beveled at half the opening angle $\psi$. These blocks 154 may then be clamped to a flat base 156 with rulings of gratings 154A, 154B in contact and aligned so that the gratings are in phase. A GH 150 with 20 degree opening angle $\psi$ was mounted adjacent to a planar grating (e.g., PGH 100, FIG. 3A) of the same dimensions on the SEM specimen stage (i.e., in the setup of FIG. 1). Two beam current scans were conducted consecutively to ensure similar beam characteristics for proper comparison. The resulting data is plotted in FIG. 5, with power from PGH as open circles and power from GH as solid dots. The GH data produced significantly higher collectable power than PGH, as shown. Since performance from a GH may be sensitive to the beam trajectory (i.e., the trajectory of beam 14 along direction 40), in one embodiment beam 14 follows a line parallel to a vertex 160 of GH 150 but offset along the horn bisected by roughly one beam radius. If the beam favors one side, then GH 150 acts much like PGH 100. Vertex 160 and blocks 154A, 154B forming a V-groove shape through which electron beam 14 passes, as shown in FIG. 6A.

Gratings 104, 152A, 152B may be formed from a wide variety of materials. In an embodiment, the material can include a conducting material, such as copper, aluminum, various alloys, gold, silver coated conducting surfaces, or combinations of these. Higher conductivity can enhance performance of an SP grating. Other considerations for choosing materials can include, e.g., durability, melting point and/or heat transfer, since the grating gets bombarded by the electron beam; and machinability, because the grating is typically fabricated by sawing, machining, and/or laser cutting.

Figure 5:
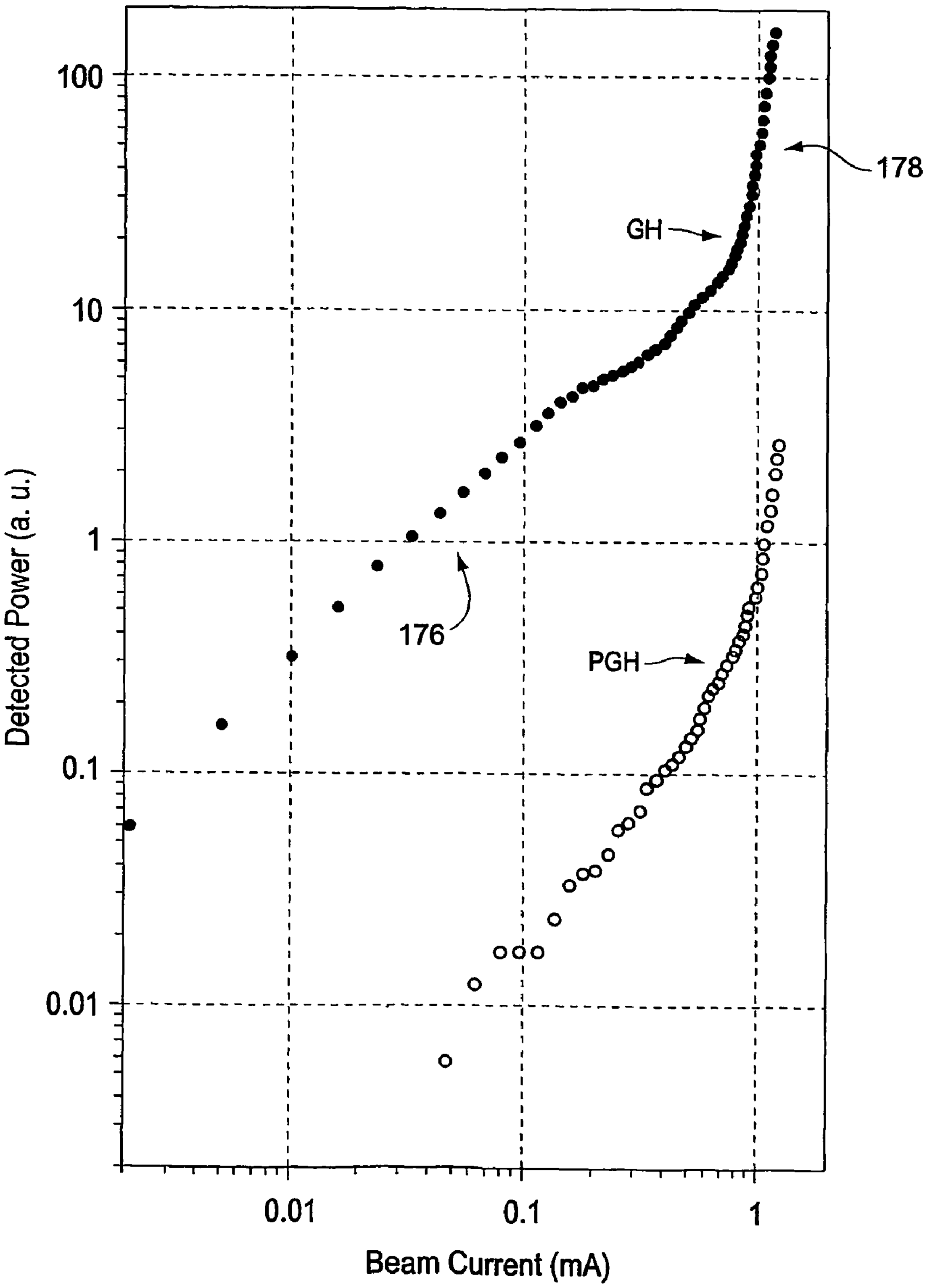
FIG. 5 depicts graphs of radiated power vs. beam current for a 20° grating horn and for a planar grating.
Figure 6A:
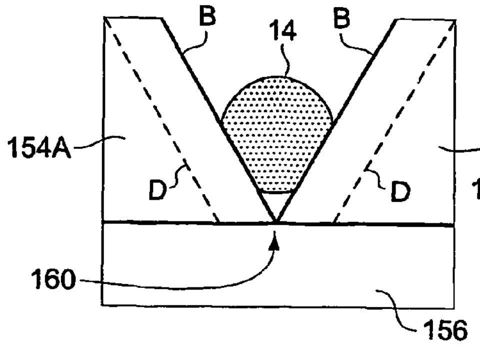
FIGS. 6A-G depict alternative embodiments of grating horns.

The output (i.e., radiation 21) from GH 150 can be similar in characteristic to PBH 100, as shown in FIG. 5 (which utilized a 29 kV beam with a 50 μm beam waist). A low-power linear regime 176, more distinct because of the increased signal, oscillates through a subthreshold region and abruptly rises in regime 178, similar to data shown in FIG. 3. The different shape of wiggle likely stems from different boundary conditions in GH 150. FIG. 5 depicts three pertinent details. First, collectable power is a multiple of at least 40 times greater with GH 150, far higher than the factor of 6 observed with the comparable PGH 100. Second, the multiple expands to 100 fold in the linear regime 176. The experimentation of FIG. 5 proved that GH 150 enhanced spontaneous S-P emission as compared to PGH 100 or other gratings. Third and most important, the multiple expands to 100 fold at the highest power because the threshold current of GH 150 is roughly 170 microamps lower than the planar grating. This indicates that GH 150 does indeed enhance the SP-FEL gain.

Figure 6B:
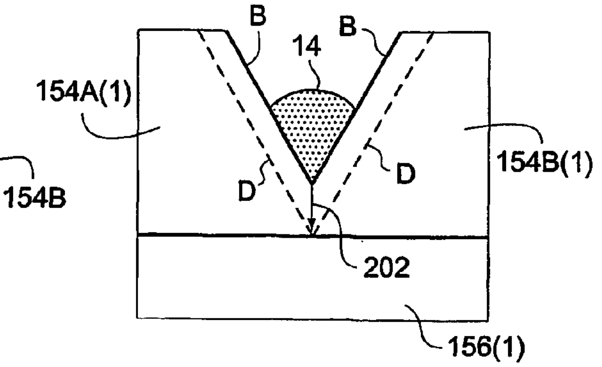
Figure 6C:
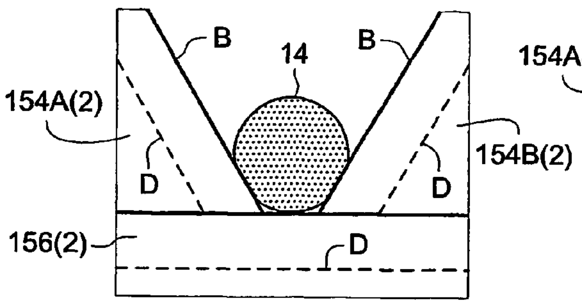

Boundary conditions largely determine the SP-FEL gain and can be altered by changing how the grating edges at vertex 160 are prepared. A wide variety of GH configurations may be used as a matter of design choice, a number of exemplary embodiments being depicted in FIGS. 6A-F. These embodiments vary the degree of resonator closure and may also provide increased amplification of Terahertz radiation, as for grating 152A, 152B depicted in FIG. 3B. In each case, a cross-sectional dimension of the electron beam 14 is also shown, for purposes of illustration In FIGS. 6A-F, the grating is formed by teeth extending between the beveled surfaces (indicated by B) and the dotted lines (indicated by D). In FIG. 6A (which essentially shows the configuration of GBH 150 tested in FIG. 5), the teeth extend from the bevel surface B to the depth D with constant depth. The beveled surfaces of the two blocks 154A, 154B meet at the base 156. In FIG. 6B, the teeth similarly have a constant depth; however, the beveled surfaces of the two blocks 154A(1), 154B(1) meet at a distance 202 above the base. In FIG. 6C, the teeth in the gratings of the two blocks 154A(2), 154B(2) similarly have a constant depth; however, the blocks 154A(2), 154B(2) do not meet, as shown (accordingly, the vertex in this case includes a flat portion 161). Instead, the base 156(2) has a grating with teeth having a depth extending from B to D.

Figure 6D:
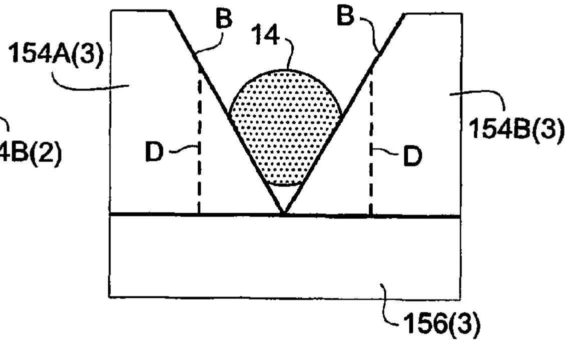
Figure 6E:
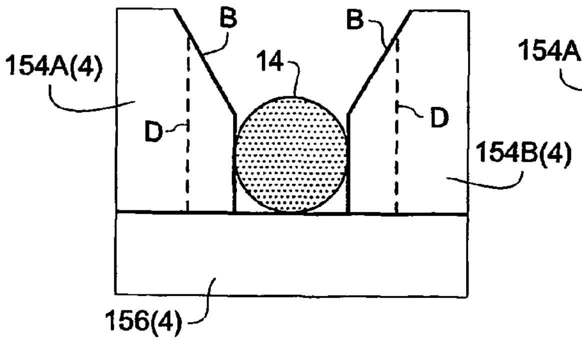
Figure 6F:
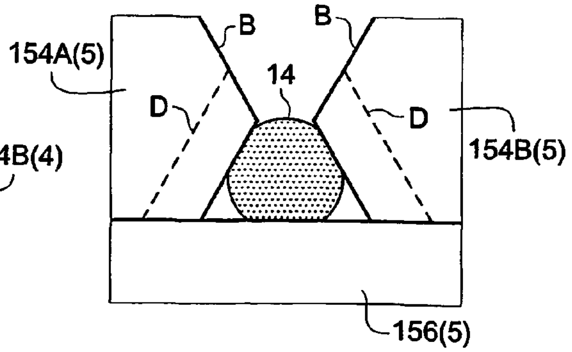

Teeth need not have constant depth, as shown, for example, in FIG. 6D. Teeth can have a "triangular" or nonconstant cross section, in which the teeth have a smaller depth toward the top and a greater depth toward the base. Not shown are related embodiments, in which the blocks having triangular teeth, but the blocks either meet above the base (as in FIG. 6B) or the base has a grating (as in FIG. 6C). Other shapes are contemplated. FIG. 6E for example depicts teeth having a "triangular" component and a "rectangular" component (accordingly, the vertex of this configuration is also shown with a flat portion 161A). FIG. 6F depicts an embodiment in which the teeth are ruled with constant depth on a bevel 173 having an acute angle relative to the base 156(5). Teeth can also have nonconstant depth, as described for other embodiments. In an embodiment, the gratings are aligned so that the grating element is fully symmetrical. In another embodiment, the grating elements are not symmetrical. In certain depicted embodiments, the teeth may be ruled in a direction perpendicular to the plane between the blocks 154; however, teeth may be ruled at other angles, as will be appreciated by persons of ordinary skill in the art upon reading and understanding this disclosure.

Figure 6G:
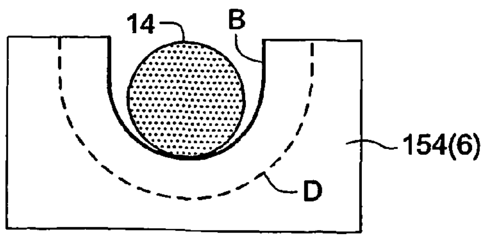

FIG. 6G shows one other GH having a cylindrical grating curved about the electron beam 14; this further may improve coupling between beam 14 and the grating.

In FIGS. 6A-6G, it should be understood that these diagrams depict only a vertex region of the horn and that the horns extend out from the vertex a distance d commensurate with Eq. (2) and with an opening angle ψ, similar to the horns shown in FIGS. 3A-B.

One advantage of GPH 150 (employing, for example, a configuration grating as in FIG. 6A to 6G), is that the generated FR radiation 21 may be sufficiently collimated to avoid use of optics 24, FIG. 1, saving cost and complexity. Accordingly, in certain embodiments herein, optics 24 are not utilized in FEL 10.

The grating element pairs of FIG. 6A-6F are typically symmetrical about a normal to the base element (e.g., pair 154A, 154B being symmetrical about a normal 159 to base element 156, as shown). In each configuration of FIG. 6A-6F, e-beam 14 interacts with the symmetrical grating element pair to produce Terahertz radiation 21, as in FIG. 1. The degree of symmetry should be at least sufficient to ensure radiation 21 has the desired properties of brightness and intensity.

By way of illustrative comparison, FIG. 7B of U.S. Pat. No. 5,790,585 shows a grating surface that conforms to a broad, elliptical electron beam. Because coupling strength decays exponentially away from the grating surface, spreading the beam out into a "ribbon" over a flat surface does improve emission; but a spread beam is nonetheless difficult to produce and control. In contrast, the GH described hereinabove (e.g., in connection with FIG. 6A-6G) may operate with a circular electron beam 14, such as shown, and such that the GH forces electrons to interact with a single spatially-coherent field mode to generate high-brightness radiation. In the prior art, regions of a spread beam (as in the '585 patent) separated by more than a wavelength can develop independently, thereby diminishing overall coupling and brightness.

Additional grating embodiments are also contemplated, such as those disclosed, e.g., in U.S. Patent Application Publication No. U.S. 2002/0097755 A1, incorporated herein by reference. The gratings may be employed in Terahertz sources such as those described in U.S. Pat. Nos. 5,263,043 and 5,790,585. The gratings may be included in Terahertz sources employed in systems for studying matter, including biological matter, as disclosed in U.S. patent application Ser. No. 10/104,980, filed Mar. 22, 2002 and incorporated herein by reference. Each of the above-listed patent applications, patent application publication, and U.S. patents are hereby incorporated herein by reference.

Figure 7:
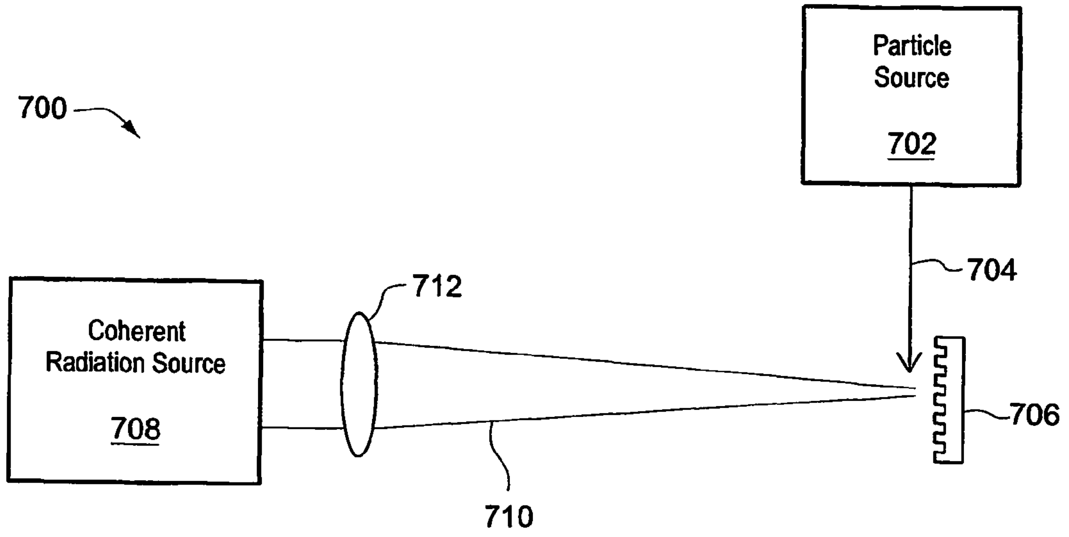
FIG. 7 shows one system for interacting particles with coherent radiation.

FIG. 7 shows one system for interacting particles with coherent radiation, useful for example in analyzing behavior and physical interaction of the particles with the radiation. A particle source 702 (e.g., an electron generator) generates a particle beam 704 (e.g., an electron beam) towards a grating horn 706 (for example employing a configuration shown in FIG. 6A-6G), as shown. A coherent radiation source 708 (e.g., a laser or source 100 depicted in FIG. 1) emits coherent radiation 710 (e.g., Terahertz radiation); optics 712 optionally focus radiation 710 to grating horn 706. Beam 704 and radiation 710 then interact so as to excite, modulate and/or stimulate particles of particle beam 704. In one embodiment, the particles are electrons that are accelerated by system 700. In another embodiment, the particles are complicated structures that interact resonantly with incident radiation 710.

Certain changes may be made in the above methods, systems, devices without departing from the scope hereof. It is to be noted that all matter contained in the above description or shown in the accompanying drawings is to be interpreted as illustrative and not in a limiting sense.

What is claimed is:

1. A grating horn, comprising:

a flat base and a pair of grating elements attached to the base, each of the grating elements being ruled with a grating period, the grating elements oriented in phase and in substantial symmetry about a normal to the flat base, such that an electron beam interacting with the grating elements produces Terahertz radiation.

2. The grating horn of claim 1, the grating elements forming a V-groove and vertex to the flat base.

3. The grating horn of claim 2, each of the grating elements being ruled perpendicular to a face of the grating element.

4. The grating horn of claim 2, the vertex intersecting the flat base.

5. The grating horn of claim 2, the vertex non-intersecting the flat base, wherein rulings of the grating elements extend between the vertex and the flat base.

6. The grating horn of claim 2, the vertex comprising a flat portion.

7. The grating horn of claim 2, wherein rulings of the grating elements are parallel to the flat base.

8. The grating horn of claim 2, wherein each of the grating elements forms a bevel edge, wherein each of the grating elements is ruled between the bevel edge and the flat base.

9. A grating horn, comprising:

a flat base; and a pair of grating elements attached to the flat base, each of the grating elements being ruled with a grating period, the grating elements oriented in phase and in substantial symmetry about a normal to the flat base, such that an electron beam interacting with the grating elements produces Terahertz radiation, wherein the grating elements form a V-groove and vertex to the flat base, and wherein each of the grating elements comprises a triangle component and a rectangular component, wherein each of the grating elements is ruled in the triangular and rectangular components and parallel to the flat base.

10. A system for generating FIR laser radiation, comprising:

an electron source for generating an electron beam; and a grating horn having a flat base and a pair of grating elements attached to the base, each of the grating elements being ruled with a grating period, the grating elements oriented in phase and in substantial symmetry about a normal to the flat base, such that the electron beam interacts with the grating elements to produce the FIR laser radiation.

11. The system of claim 10, further comprising optics to focus radiation scattered from the grating horn into a laser beam.

12. The system of claim 10, further comprising a chamber for housing the grating horn, and a window for transmitting the FIR radiation from inside the housing to outside of the housing.

13. A system for generating FIR laser radiation, comprising:

an electron source for generating an electron beam; and a plurality of gratings, each of the gratings being positionable to a focus of the electron beam to interact with the electron beam to produce the FIR laser radiation, each of the gratings being ruled differently to modify emission wavelength of the FIR radiation;

wherein one or more of the plurality of gratings comprises a grating horn having a flat base and a pair of grating elements attached to the base, each of the grating elements being ruled with a grating period, the grating elements oriented in phase and in substantial symmetry about a normal to the flat base, such that the electron beam interacts with the grating elements to produce the FIR laser radiation.

14. A method for generating FIR laser radiation, comprising:

generating an electron beam; and focusing the electron beam to a grating horn, the grating horn comprising a flat base and a pair of grating elements attached to the base, each of the grating elements being ruled with a grating period, the grating elements oriented in phase and in substantial symmetry about a normal to the flat base, wherein interaction between the electron beam and the grating elements produces the FIR laser radiation.

15. The method of claim 14, further comprising focusing the FIR radiation into a laser beam with one or more optical elements.

* * * * *